US010059522B2

(12) United States Patent
Wargo et al.

(10) Patent No.: US 10,059,522 B2
(45) Date of Patent: Aug. 28, 2018

(54) DIVERT CHUTES IN SORTING-CONVEYOR SYSTEMS

(71) Applicant: Laitram, L.L.C., Harahan, LA (US)

(72) Inventors: Stephen G. Wargo, Laurel, MD (US); David F. McNew, III, Glen Burnie, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/344,065

(22) Filed: Nov. 4, 2016

(65) Prior Publication Data

US 2018/0127213 A1    May 10, 2018

(51) Int. Cl.
*B65G 11/20*    (2006.01)
*B65G 13/00*    (2006.01)

(52) U.S. Cl.
CPC ............ *B65G 13/00* (2013.01); *B65G 11/203* (2013.01); *B65G 2201/0285* (2013.01)

(58) Field of Classification Search
CPC ........................... B65G 11/203; B65G 13/075
USPC ..................................... 193/32, 35 A, 38, 40
See application file for complete search history.

(56) References Cited

U.S. PATENT DOCUMENTS

| 4,193,489 | A | * | 3/1980 | Siniscal | ............ | B65G 47/8823 |
| | | | | | | 198/406 |
| 4,328,889 | A | | 5/1982 | Maxted | | |
| 6,015,039 | A | | 1/2000 | Bonnet | | |
| 6,533,099 | B2 | | 3/2003 | Bonham et al. | | |
| 7,073,651 | B2 | | 7/2006 | Costanza et al. | | |
| 7,306,086 | B2 | | 12/2007 | Boelaars | | |
| 7,506,751 | B2 | | 3/2009 | Fourney | | |
| 8,245,835 | B2 | | 8/2012 | Balk et al. | | |
| 8,528,742 | B2 | | 9/2013 | Wargo et al. | | |
| 9,156,629 | B2 | * | 10/2015 | Costanzo | ............... | B65G 17/24 |
| 9,415,936 | B1 | * | 8/2016 | Rodriguez | ........... | B65G 11/163 |

FOREIGN PATENT DOCUMENTS

JP    05043025 A    2/1993

OTHER PUBLICATIONS

Google dictionary search for "protrude": (https://www.google.com/search?rlz=1C1GCEB_enUS775US775&ei=ck2gWsnROY7n_QbZ86LwDg&q=protrudedefinition&oq=protrudedefinition&gs_l=psy-ab.3. .0i7i30k1l10.6011888.6015667.0.6015865.8.8.0.0.0.0.483.1184.0j6j4-1.7.0 . . . 0 . . . 1c.1.64.psy-ab..1.7.1178 . . . 0i13k1.0.DdjMN14YmEE). 2018.*
International Search Report and Written Opinion of the International Searching Authority, PCT/US2017/058021, dated Jan. 22, 2018, Korean Intellectual Property Office, Republic of Korea.

* cited by examiner

*Primary Examiner* — Gene O Crawford
*Assistant Examiner* — Lester Ill Rushin
(74) *Attorney, Agent, or Firm* — James T. Cronvich

(57) ABSTRACT

A divert chute and a sorting conveyor system having divert chutes that include an array of high-friction rollers in a landing zone to resist the cross-chute momentum of parcels diverted off the sorting conveyor at high speeds. The rollers, which protrude above a flat slide region of the chute, rotate only in a direction down the chute. Parcels sliding axially along the high-friction rollers across the chute are slowed or stopped in the cross-chute direction while being redirected down the chute.

19 Claims, 2 Drawing Sheets

DIVERT CHUTES IN SORTING-CONVEYOR SYSTEMS

BACKGROUND

The invention relates generally to power-driven conveyors and more particularly to conveyors that sort parcels off the side onto chutes.

In various industries, such as in package- and parcel-handling, sorting conveyors are used to sort parcels off one or both sides onto discharge chutes. Gravity roller conveyors or flat-faced slides that decline downward from the sides of the sorting conveyor are examples of two kinds of discharge chutes. Parcels diverted off the sorting conveyor at high speeds can become airborne. In a typical gravity roller conveyor, each of the parallel rollers extends across the full width of the chute. An airborne parcel that lands on the metal rollers can slide axially along the rollers and flip up over the rail at the side of the chute. A similar result can occur with a flat-faced chute. So both of these kinds of chutes have to be made wide enough to provide a long enough stopping distance for airborne parcels.

Another kind of discharge chute that is used with sorting conveyors is constructed of a mat with shorter rollers arranged in rows and columns. The rollers are mounted on axles to rotate freely in a direction toward the lower end of the chute. Some of the rollers near the upper end of the chute in the parcel-landing zone have high-friction peripheries to help slow the parcels upon landing. But because the high-friction rollers are at the same height as the other rollers, which are low friction, the parcels that land on the low-friction rollers have their preferred divert trajectories altered before the entire parcel is over the chute.

SUMMARY

One version of a sorting conveyor system embodying features of the invention comprises a sorting conveyor conveying parcels in a conveying direction and a plurality of divert chutes disposed along a side of the sorting conveyor to receive parcels diverted off the side. The sorting conveyor has a series of sorting sections with diverters selectively diverting the parcels off the side and onto the chutes. Each of the divert chutes includes an upper end adjacent the side of the sorting conveyor and a lower end defining the length of the chute with the upper end. An upstream side of the chute is spaced apart from a downstream side in the conveying direction to define the width of the chute. A slide region extends from the upper end to the lower end and has a flat outer surface. An array of rollers protrudes above the level of the flat outer surface at the upper end closer to the downstream side than to the upstream side in position to receive airborne parcels. The rollers have high-friction peripheries, and the rollers are rotatable in a direction down the chute toward the lower end to resist the conveying-direction momentum of the airborne parcels and to redirect the parcels onto the slide region and toward the lower end.

In another aspect a method for sorting parcels comprises: (a) conveying parcels in a conveying direction; (b) selectively diverting parcels onto a declining divert chute having a slide section with a parcel-contacting flat upper surface and having an array of rollers extending above the level of the flat upper surface and rotatable in a direction transverse to the conveying direction and positioned in the divert chute to receive airborne parcels; (c) resisting the conveying-direction momentum of the airborne parcels with the array of rollers arranged to rotate in a direction transverse to the conveying direction; (d) redirecting the parcels atop the rollers to the slide section by rotation of the rollers in the direction down the divert chute; and (e) sliding the parcels received from the array of rollers down the slide section of the divert chute by gravity.

DETAILED DESCRIPTION

Figure 1:
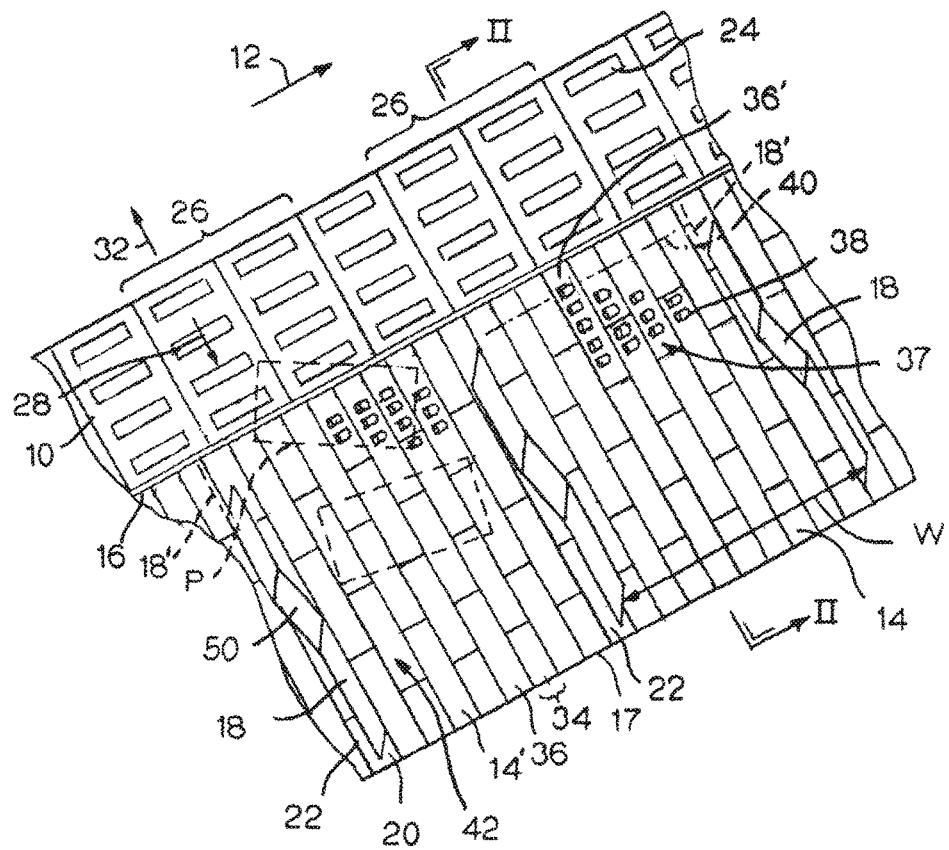
FIG. 1 is an axonometric view of a portion of a sorting conveyor embodying features of the invention.
Figure 2:
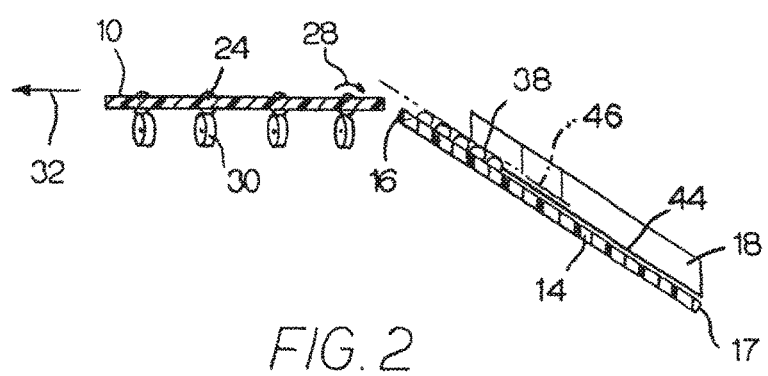
FIG. 2 is a cross section of the sorting conveyor taken along lines II-II of FIG. 1.

A sorting conveyor system embodying features of the invention is shown in FIGS. 1 and 2. The system comprises a sorting conveyor 10, or sorter, conveying articles such as packages, parcels, and envelopes in a conveying direction 12. Divert chutes 14, 14' abut one side of the sorter 10 and decline downward from an upper end 16 to a lower end 17 defining the length of the chute. In this example the divert chutes 14, 14', as well as other such chutes upstream and downstream, are contiguous and separated by side walls 18. Each side wall 18 separates an upstream side 20 of a chute 14 from a downstream side 22 of a contiguous chute. The distance between consecutive walls 18 defines the width W of the chutes 14. The chutes do not have to be contiguous as in this example. The upper ends of the side walls 18 are recessed downward from the upper ends 16 of the chutes 14, 14' in this version. Imaginary continuations 18' of the side walls 18 to the upper ends 16 are used to artificially define the upstream and downstream sides 20, 22 of the chutes 14, 14' in the recessed region.

The sorting conveyor 10 is shown as an activated-roller conveyor belt, such as the INTRALOX® Series 7000 belt manufactured and sold by Intralox, L.L.C., of Harahan, La., U.S.A. The belt rollers 24 are selectively actuated in a divert zone 26 by an actuating mechanism in the belt carryway to rotate in the divert direction 28 to push parcels P off the side of the belt and onto a chute. Together, the belt rollers 24 and the actuating mechanism form a diverter in each divert zone 26. The actuating mechanism, which includes actuating rollers 30 under each column of belt rollers 24 in each divert zone 26, provides actuating-roller surfaces that are free to rotate in a direction oblique to the conveying direction 12. The belt rollers 24, whose axes of rotation are parallel to the conveying direction, roll on the actuating rollers 30. In the oblique orientation shown in FIG. 2, the actuating rollers 30 cause the belt rollers 24 to rotate in the divert direction 28 toward the chutes 14. The resultant of the vector sum of the component of belt motion in the conveying direction 12 and the component of belt-roller rotation 28 is an oblique divert angle off the side of the belt.

The actuating mechanism swivels the actuating rollers 30 about a vertical axis to a position in which their axes of rotation are perpendicular to the axes of the belt rollers to disable diversion and convey parcels downstream on the sorter 10. The actuating mechanism can also swivel the actuating rollers 30 to an oblique orientation that is the mirror image about the conveying direction 12 of the roller orientation in FIG. 2 to selectively divert parcels to the left 32 onto chutes (not shown) on the other side of the belt in a bilateral sorting conveyor system. An example of an actuating mechanism for use with the INTRALOX® Series 7000 roller belt is described in U.S. Pat. No. 7,506,751, "Conveyor Systems for Diverting Objects," Matthew L. Fourney, Mar. 24, 2009. The disclosure of that patent is incorporated into this description by reference.

The contiguous divert chutes 14, 14' shown in FIGS. 1 and 2 are made of a continuous mat 33 constructed of linked rows 34 of side-by-side modules-flat-top modules 36 and integrated-roller modules 36'—such as a section of modular plastic conveyor belting. The side walls 18 sit on or are supported slightly above the stationary mat 33. The mat 33 provides an array 37 of rollers 38 near the upper end 16 of each chute 14, 14'. The rollers 38 rotate on axles defining axes of rotation 40 parallel to the conveying direction 12 of the sorting conveyor 10 to direct parcels down the chute. The rollers 38 have a high-friction periphery made of a rubber or elastomeric material, for example. The majority of the outer surface of each chute 14, 14' comprises a slide region 42 that extends from the upper end 16 to the lower end 17 of the chute and surrounds the roller array 37. The slide region 42 is characterized by a flat outer surface 44 along which diverted parcels slide down the chute 14, 14' under the influence of gravity. The length of the slide region 42 in the conveying direction 12 upstream of the roller array 37 in each chute 14, 14' is greater than the length of the roller array 37 in the conveying direction. The tops of the chute rollers 38 lie in a plane 46 above the level of the flat outer surface 44 of the slide region 42. The array 37 of rollers 38 in each chute is positioned near the upper end 16 of the chute closer to the downstream side 22 than to the upstream side 20. The array 37 does not extend down the full length of the chute. The array 37 of rollers 38 is positioned so that airborne parcels P diverted from the sorter 20 land on the array. Because the rollers 38 can't rotate in the conveying direction 12 and have high-friction peripheries, they act as brakes resisting the cross-chute, or conveying-direction, momentum of the parcels P along the roller axes 40. In that way parcels P are slowed enough or stopped so that they don't flip over the downstream side wall and into the neighboring chute. The braking effect also enables the widths of the divert chutes to be reduced to 22 inches (71 cm) from the more common 28 inches. As also shown in FIG. 1, jogs 50 in the side walls 18 below the array 37 of rollers 38 position the downstream sides 22 at the lower ends 17 of the chutes 14, 14' downstream of the downstream sides at the upper ends 16. So the lower ends of the chutes 14, 14' in this example are offset in the conveying direction 12 from the upper ends 16. While the rollers 38 are slowing the parcels P in the conveying direction 12, the rollers also rotate by gravity to redirect the parcels down the chutes 14, 14' and onto the slide regions 42 below.

Figure 3:
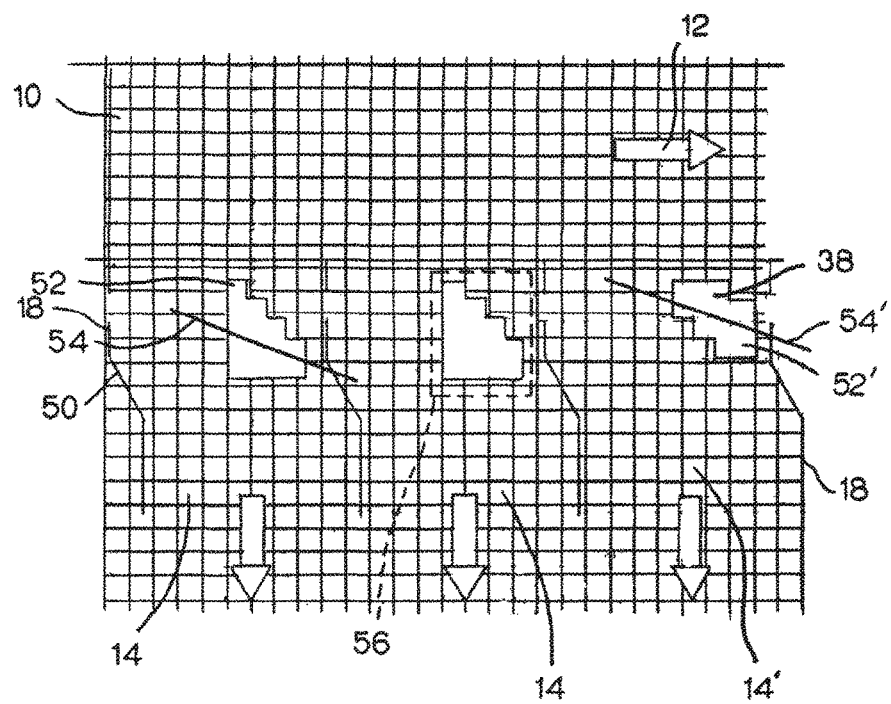
FIG. 3 is a top plan schematic of a sorting conveyor as in FIG. 1.

The arrays 37 of chute rollers 38 are shown in two patterns in FIGS. 1 and 3. Other patterns are possible. The roller patterns are described in reference to FIG. 3. Each shaded block in FIG. 3 represents a chute roller 38. Two array patterns are shown: a first array pattern 52 for the arrays 37 in the first two chutes 14 and a second array pattern 52' in the third chute 14'. If the rollers 38 in each pattern 52, 52' are considered as a spread of points in a two-dimensional coordinate system, best-fit lines 54, 54' to those points are shown in FIG. 3. In both cases the best-fit lines 54, 54' diverge from the sorter conveying direction 12 downstream. Furthermore, the chute rollers 38 can be freely rotatable passive rollers rotatable by gravity or active rollers continuously or selectively rotated by powered rollers or belts below the chute or by other roller-actuating mechanisms 56 that help prevent lightweight parcels from being stranded atop the chute rollers.

Although the sorting conveyor 10 was described as a specific kind of activated-roller belt, the sorter could be realized as a shoe sorter with diverting shoes, a tilt-tray sorter, a roller conveyor with swivel, cross-belt, or pusher diverters, or as activated-roller belts with oblique, or angled, rollers, for example. And the chutes 14, 14' can be realized other than with modular plastic conveyor belt mats. For example, the array of rollers could protrude up from a flat plastic or metal sheet that supports the rollers and forms the slide regions of the chutes.

What is claimed is:

1. A divert chute comprising:
    an upper end for positioning adjacent a side of a sorting conveyor conveying parcels in a conveying direction;
    a lower end defining the length of the chute with the upper end;
    an upstream side and a downstream side spaced apart from the upstream side in the conveying direction and defining the width of the chute;
    a slide region extending from the upper end to the lower end and having a flat outer surface;
    an array of rollers extending above the level of the flat outer surface at the upper end closer to the downstream side than to the upstream side, wherein a portion of the flat outer surface lies between the upstream side and the array of rollers;
    wherein the rollers have high-friction peripheries; and
    wherein the rollers are rotatable in a direction down the chute toward the lower end to resist the conveying-direction momentum of the parcels and help roll the parcels onto the slide region and toward the lower end.

2. A divert chute as in claim 1 wherein the array of rollers is characterized by a best-fit line that diverges from the conveying direction downstream.

3. A divert chute as in claim 1 wherein the slide region surrounds the array of rollers.

4. A divert chute as in claim 1 wherein the length of the slide region in the conveying direction upstream of the array of rollers is greater than the length of the array of rollers in the conveying direction.

5. A divert chute as in claim 1 wherein the high-friction peripheries of the rollers are made of a rubber or elastomeric material.

6. A divert chute as in claim 1 wherein the rollers are freely rotatable on axles defining axes of rotation parallel to the conveying direction.

7. A divert chute as in claim 1 further comprising a roller-actuating mechanism selectively or continuously rotating the rollers down the chute.

8. A divert chute as in claim 1 wherein the downstream side at the lower end is downstream of the downstream side at the upper end.

9. A sorting conveyor system comprising:
    a sorting conveyor conveying parcels in a conveying direction and having a series of sorting sections with diverters selectively diverting the parcels off a side of the sorting conveyor;
    a plurality of divert chutes disposed along the side of the sorting conveyor to receive the parcels diverted off the side, each of the divert chutes including:
        an upper end adjacent the side of the sorting conveyor;
        a lower end defining the length of the chute with the upper end;
        an upstream side and a downstream side spaced apart from the upstream side in the conveying direction and defining the width of the chute;

a slide region extending from the upper end to the lower end and having a flat outer surface;

an array of rollers protruding above the level of the flat outer surface at the upper end closer to the downstream side than to the upstream side in position to receive airborne parcels, wherein a portion of the flat outer surface lies between the upstream side and the array of rollers;

wherein the rollers have high-friction peripheries; and wherein the rollers are rotatable in a direction down the chute toward the lower end to resist the conveying-direction momentum of the airborne parcels and redirect the parcels onto the slide region and toward the lower end.

10. A sorting conveyor system as in claim 9 comprising a plurality of the divert chutes disposed along both sides of the conveyor and wherein the sorting sections selectively divert parcels off both sides of the sorting conveyor onto the divert chutes.

11. A sorting conveyor system as in claim 9 wherein the diverters divert the parcels obliquely off the side of the sorting conveyor.

12. A sorting conveyor system as in claim 9 wherein the plurality of divert chutes are contiguous and include walls separating contiguous divert chutes.

13. A sorting conveyor as in claim 12 wherein the walls are recessed downward from the upper ends of the divert chutes.

14. A sorting conveyor system as in claim 12 wherein the walls have a jog in the conveying direction and toward the lower end.

15. A sorting conveyor system as in claim 9 wherein the upper flat surfaces of the slide regions of all the divert chutes form a single continuous flat surface.

16. A sorting conveyor system as in claim 9 wherein the slide region and the array of rollers are realized by a stationary mat formed by a modular conveyor belt made of interconnected flat-top belt modules and integrated-roller belt modules.

17. A sorting conveyor system as in claim 9 wherein the sorting conveyor includes a conveyor belt advancing in the conveying direction and having a plurality of belt rollers supporting the parcels and wherein the diverters selectively actuate the belt rollers to rotate to divert the parcels onto the divert chutes.

18. A method for sorting parcels comprising:
conveying parcels in a conveying direction;
selectively diverting parcels onto a declining divert chute having a slide section with a parcel-contacting flat upper surface and having an array of rollers extending above the level of the flat upper surface and tilted downward along the declining divert chute and rotatable in a direction transverse to the conveying direction and positioned in the divert chute to receive airborne parcels;
resisting the conveying-direction momentum of the airborne parcels with the array of rollers arranged to rotate in a direction transverse to the conveying direction;
redirecting the parcels atop the rollers to the slide section by rotation of the rollers in the direction down the divert chute;
sliding the parcels received from the array of rollers down the slide section of the divert chute by gravity.

19. The method of claim 18 comprising also resisting the conveying-direction momentum of the parcel with a high-friction material on the outer surface of the rollers.

* * * * *